(12) United States Patent
Rossi et al.

(10) Patent No.: US 10,530,893 B2
(45) Date of Patent: Jan. 7, 2020

(54) METHOD FOR MANAGING PACKETS IN A NETWORK OF INFORMATION CENTRIC NETWORKING (ICN) NODES

(71) Applicant: Institut Mines-Telecom, Paris (FR)

(72) Inventors: Dario Rossi, Paris (FR); Giuseppe Rossini, Cambridge (GB)

(73) Assignee: Institut Mines-Telecom (FR)

( * ) Notice: Subject to any disclaimer, the term of this patent is extended or adjusted under 35 U.S.C. 154(b) by 270 days.

(21) Appl. No.: 15/316,632

(22) PCT Filed: Jun. 8, 2015

(86) PCT No.: PCT/EP2015/062727
§ 371 (c)(1),
(2) Date: Dec. 6, 2016

(87) PCT Pub. No.: WO2015/185756
PCT Pub. Date: Dec. 10, 2015

(65) Prior Publication Data
US 2017/0149932 A1 May 25, 2017

(30) Foreign Application Priority Data

Jun. 6, 2014 (EP) .................................. 14305866

(51) Int. Cl.
*H04L 29/08* (2006.01)
*H04L 12/813* (2013.01)

(52) U.S. Cl.
CPC ............ *H04L 67/327* (2013.01); *H04L 47/20* (2013.01); *H04L 67/1004* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 10,033,804 B2 * | 7/2018 | Schapira | H04L 67/2804 |
| 2002/0083187 A1 * | 6/2002 | Sim | G06F 17/30194 709/235 |

(Continued)

FOREIGN PATENT DOCUMENTS

| | | |
|---|---|---|
| EP | 2120419 A2 | 11/2009 |
| EP | 2432187 A1 | 3/2012 |

OTHER PUBLICATIONS

Ioannis Psaras, Probabilistic In-Network Caching for Information-Centric Networks, published 2012 (Year: 2012).*

(Continued)

*Primary Examiner* — Joshua Joo
(74) *Attorney, Agent, or Firm* — Lerner, David, Littenberg, Krumholz & Mentlik, LLP

(57) ABSTRACT

The present invention relates to a method for managing packets in a network of Information Centric Networking (ICN) nodes (1, 2a, 2b, 2c, 2d, 2e), the method comprising: —at a first node (1), performing steps of: ○ Receiving a request (i) for a data packet (C), and if the data packet (C) is stored, responding to the request (i) by forwarding the data packet (C); otherwise ○ sending to at least one neighboring node (2a, 2b) of the network a request (i') for meta-data packets (@), a meta-data packet (@) indicating availability of said data packet (C) at a target node; ○ receiving in response at least one meta-data packet (@), so as to identify at least one target node (2c, 2e) wherein said data packet (C) is available; ○ forwarding the request (i) for said data packet (C) toward one selected target node (2c); —at a second node (2a, 2b, 2c, 2d, 2e), performing steps of: ○ Receiving a request (i') for meta-data packets (@), and if the data packet (C) is stored, responding to the request (i') by forwarding a meta-data packet (@) indicating availability of said data packet (C) at the second node (2c, 2e); otherwise ○ forwarding to at least one neighboring node (2c, 2d, 2e) of the network the request (i') for meta-data packets (@).

13 Claims, 5 Drawing Sheets

(56) References Cited

U.S. PATENT DOCUMENTS

| | | | |
|---|---|---|---|
| 2004/0019658 A1* | 1/2004 | Plastina | G06F 16/40 709/217 |
| 2004/0093466 A1* | 5/2004 | Hull | H04L 67/18 711/133 |
| 2012/0129446 A1* | 5/2012 | Ko | H04L 12/2803 455/3.03 |
| 2012/0314580 A1* | 12/2012 | Hong | H04L 67/327 370/236 |
| 2013/0124692 A1* | 5/2013 | Yang | H04L 12/2812 709/219 |
| 2013/0198339 A1* | 8/2013 | Lee | H04L 67/06 709/219 |
| 2014/0164552 A1* | 6/2014 | Kim | H04L 67/2842 709/214 |
| 2014/0173034 A1* | 6/2014 | Liu | H04L 67/1063 709/217 |
| 2016/0036902 A1* | 2/2016 | Varadarajan | H04L 67/1095 709/204 |
| 2017/0118529 A1* | 4/2017 | Dietrich | H04L 29/06 |

OTHER PUBLICATIONS

Rossini Giuseppe et al: "Evaluating CCN multi-path interest forwarding strategies", Computer Communications, Elsevier Science Publishers BV, Amsterdam, NL, vol. 36, No. 7, Feb. 1, 2013 (2813-02-01) pp. 771-778—XP828526441, ISSN: 0140-3664—D01: 10.1016/J.COMCOM.2813.01.888 p. 771, left-hand column, paragraph 1, p. 773, left-hand column, paragraph 2 p. 774, left-hand column, paragraph 2, p. 775, left-hand column, paragraph 3. Van Jacobson et al: "Networking Named Content" CONEXT '89 Proceedings of the 5th International Conference on Emerging Networking Experiments and Technologies; Dec. 1-4, 2009; Rome, Italy, Assoc1ati0n for Computing Machinery, New York, NY, USA, Dec. 1, 2009 (Dec. 1, 2009), pp. 1 -12. International Search Report for Application No. PCT/EP2015/062727 dated Sep. 2, 2015. European Search Report for Application No. 14305866 dated Nov. 27, 2014. Seyed Kaveh Fayazbakhsh et al., "Less pain, most of the gain: Incrementally Deployable ICN," SIGCOMM, ACM, 27 Penn Plaza, Suite 701, New York, NY 10121-0301, Aug. 27, 2013, pp. 147-158.

* cited by examiner

METHOD FOR MANAGING PACKETS IN A NETWORK OF INFORMATION CENTRIC NETWORKING (ICN) NODES

CROSS REFERENCE TO RELATED APPLICATIONS

The present application is a national phase entry under 35 U.S.C. § 371 of International Application No. PCT/EP2015/062727, filed Jun. 8, 2015, published in English, which claims the benefit of the filing date of European Patent Application No. 14305866.7, filed Jun. 6, 2014, the disclosures of which are hereby incorporated herein by reference.

FIELD OF THE INVENTION

The field of this invention is that of Information Centric Networking (ICN).

More particularly, the invention relates to a method for managing packets in a network of ICN nodes.

BACKGROUND OF THE INVENTION

Information Centric Networking (ICN) is an alternative approach to the architecture of computer networks. Its founding principle is that a communication network should allow a user to focus on the needed data, rather than having to reference a specific, physical location where that data is to be retrieved from. This stems from the fact that the vast majority of current Internet usage (90%) consists of data being disseminated from a source to a number of users.

ICN has introduced a new networking model, where the communication is centered on named-data rather than host address. Indeed, in ICN every data packet is identified, addressed and retrieved by its unique name instead of its physical location.

Among the several ICN architectures that have been proposed in recent years, the best known example is represented by the Content Centric Networking (CCN), also known as Named Data Networking (NDN). While ICN architectures generally differ in a number of choices (e.g., flat vs hierarchical naming strategy, routing and forwarding strategies, granularity of minimum addressable entity, etc.), they however generally have common points—such as featuring caching functionalities as primitive in the architecture. Since a common terminology that encompasses all ICN proposals is currently missing, in this context we adopt the CCN lingo for the sake of clarity, but we point out that our approach is applicable to a greater extent.

Thus, in ICN all network nodes (routers) potentially store a content (which is split in "chunks", i.e. elementary fragments of data with a given size, in other words "blocks") that they forward to serve future requests for the same content. Therefore, it is possible to equip network nodes with enhanced storage capabilities such as caches/buffer memories. Indeed, storage resources can be used to maintain temporary content replicas spread through the network for a period of time ranging from minutes to hours or days. The availability of different replicas depends on several factors, such as content popularity, cache replacement policies, and is impacted by the request forwarding policy. The term "request forwarding policy" refers here broadly and as non-limitative, to ways/rules to manage the forwarding of a content request within a network comprising nodes. In fact, request forwarding policy plays an important role in providing better end-users performance (ex: data delivery time) and reducing the amount of data transferred in a network, i.e. providing a lower network load.

Servers in ICN announce the set of content items they can serve by means of routing protocols, i.e. prefixes of permanently stored items. Network nodes receiving these announcements build their forwarding/routing tables accordingly. For instance network nodes store in their routing tables, the shortest paths in terms of delay towards a permanent copy of a file. Chunks of a file are then requested by a receiver, through Interest packets that are forwarded by network nodes towards servers storing permanent copies of the requested chunks.

Interest packet here is a packet type, referring to interest/request about content item/file. Another packet type referred in this document is Data packet, corresponding to data transmitted in response to an interest/request of content (i.e. Interest packet). Indeed, a Data packet may be a chunk of a content item/file. Interest packet leaves traces that a matching chunk (i.e. Data packet) can follow via reverse path, to reach back the original requester. A matching chunk can be found in every node caching a temporary copy or at the server where the permanent copy is stored. In fact, one Interest packet permits to retrieve one Data packet. Hence, a sequence of Interest packets permits to retrieve a sequence of Data packets, i.e. for instance the chunks of a large piece of content such as a video file.

On the algorithmic side, a ICN node not only performs forwarding functions (similarly to an IP router) but additionally implements caching decision and replacement policies (unlike in IP). As represented by FIG. 1, at high level a cache network can be modeled as a triple (F, D, R), where:
- F represents the forwarding policy, determining the next hop for each content request, whereas content items travel back along breadcrumbs left by the requests;
- a meta-caching algorithm D let nodes decide whether to store any new content item passing by;
- a replacement algorithm R selects, in case of positive decision in the previous step, which cache element should be replaced to make room for the new one.

Given the pervasiveness of caches in ICN, meta-caching is considered a crucial element to differentiate content of individual caches. Forwarding is instead essential to extend the reach beyond caches that lay on the path toward the repository, possibly reaching off path copies.

Yet, while ICN performances are dependent on the triple F, D, R, research has so far limitedly considered a single of the above aspect in isolation. More specifically, work focusing on F aims at implementing policies to efficiently reach off-path caches, and assumes that newly arriving content is always cached generally referred to as Leave a Copy Everywhere (LCE) in meta-caching terms.

Work focusing on D instead aims at implementing policies to reduce cache redundancy, and assumes that requests are forwarded according to Shortest Path Routing (SPR). Most importantly, a debate has been recently ignited around the usefulness of ubiquitous caching. In particular, very recent work shows that the most of the caching gain is attainable by simply (and painlessly) caching at the edge of the network.

A crucial point is still missing: the interaction of the above policies concurs in determining the global ICN performance.

While an ideal forwarding policy F (that achieves optimal forwarding decisions) has been correctly select, the implicit subsequent selection of the D, R pair (and especially of the meta-caching policy D) yields to significant underestimation of the achievable ICN performances.

Hence, a first innovation consist in the jointly considering (and solving) both problems.

A second, more crucial innovation, consist in proposing practically implementable schemes that achieve performance of optimal schemes. These ideal schemes, known in the literature (see S. K. Fayazbakhsh, Y. Lin, A. Tootoonchian, A. Ghodsi, T. Koponen, B. M. Maggs, K. Ng, V. Sekar, and S. Shenker. "Less pain, most of the gain: Incrementally deployable". In ACM SIGCOMM, 2013) as ideal Nearest Replica Routing (iNRR) have desirable properties (i.e., to attain the closest cached replica) yet they are hard to implement in a general network setting—as the closest replica cannot be advertised in the control plane, whereas ICN data plane lookups trigger unnecessary cache eviction, yielding to "cache pollution" (i.e., unnecessary content eviction when the new data is stored at multiple hops in the path) and letting the system operate in an inefficient point.

There is a need for a method allowing to explore the network and to find the closest replica, while eliminating problems arising from cache pollution.

SUMMARY OF THE INVENTION

For these purposes, the present invention provides a method for managing packets in a network (in particularly a network of ICN nodes), the method comprising:
at a first node, performing by processing means of the first node steps of:
Receiving a request for a data packet,
if the data packet is stored by the first node, responding to the request by forwarding the data packet;
otherwise
sending to at least one neighboring node of the network a request for meta-data packets, a meta-data packet indicating availability of said data
receiving in response at least one meta-data packet, so as to identify at least one target node wherein said data packet is available;
selecting one target node among identified target nodes;
forwarding the request for said data packet toward selected target node;
receiving in response the data packet;
responding to the request by forwarding the data packet;
at a second node, performing by processing means of the second node steps of:
Receiving a request for meta-data packets,
if the data packet is stored by the second node, responding to the request by forwarding a metadata packet indicating availability of said data packet at the second node;
otherwise
forwarding to at least one neighboring node of the network the request for meta-data packets.

Preferred but non limiting features of the present invention are as follow:
the meta-data packet indicating availability of said data packet is a header of the data packet;
the at least one neighboring node(s) to which a request for meta-data packets is sent or forwarded, is/are chosen according to a given forwarding policy;
the given forwarding policy is scoped flooding within a given exploration radius;
the step of receiving at the first node the data packet from the selected target node comprises caching the data packet at the first node and/or any node through which the first node is connected to the selected target node, according to a given caching decision policy;
the given caching decision policy is Leave a Copy Down (LCD);
the step of receiving at the first node the data packet from the selected target node comprises deleting the data packet in at least one identified target node according to a given cache replacement policy;
the given cache replacement policy is chosen between Least Recently Used (LRU) and random replacement;
the selected target node is either the node among identified target nodes from which is firstly received at the first node a meta-data packet indicating availability of said data packet, or the node among identified target nodes which is the closest in number of hops or the least loaded;
at least one node of the network is both adapted for:
behaving as a first node if receiving a request for a data packet; and
behaving as a second node if receiving a request for meta-data packets.

In a second aspect, the invention provides a Information Centric Networking (ICN) node in a network, comprising processing means configured so as to perform:
if receiving a request for a data packet,
if the data packet is stored by the node, responding to the request by forwarding the data packet;
otherwise
sending to at least one neighboring node of the data packet indicating availability of said data packet at a target node;
receiving in response at least one meta-data packet, so as to identify at least one target node wherein said data packet is available;
selecting one target node among identified target nodes;
forwarding the request for said data packet toward selected target node;
receiving in response the data packet;
responding to the request by forwarding the data packet;
if receiving a request for meta-data packets,
if the data packet is stored by the node, responding to the request by forwarding a meta-data packet indicating availability of said data packet at the node;
otherwise
forwarding to at least one neighboring node of the network the request for meta-data packets.

According to a third aspect, the invention provides a network of Information Centric Networking (ICN) nodes according to the second aspect of the invention.

According to a fourth and a fifth aspects, the invention provides a computer program product, comprising code instructions for executing a method according to the first aspect for managing packets in a network of Information Centric Networking (ICN) nodes; and a computer-readable medium, on which is stored a computer program product comprising code instructions for executing a method according to the first aspect for managing packets in a network of Information Centric Networking (ICN) nodes.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

First and Second Nodes

The present invention relates to a method for managing packets in a ICN network.

Figure 1:
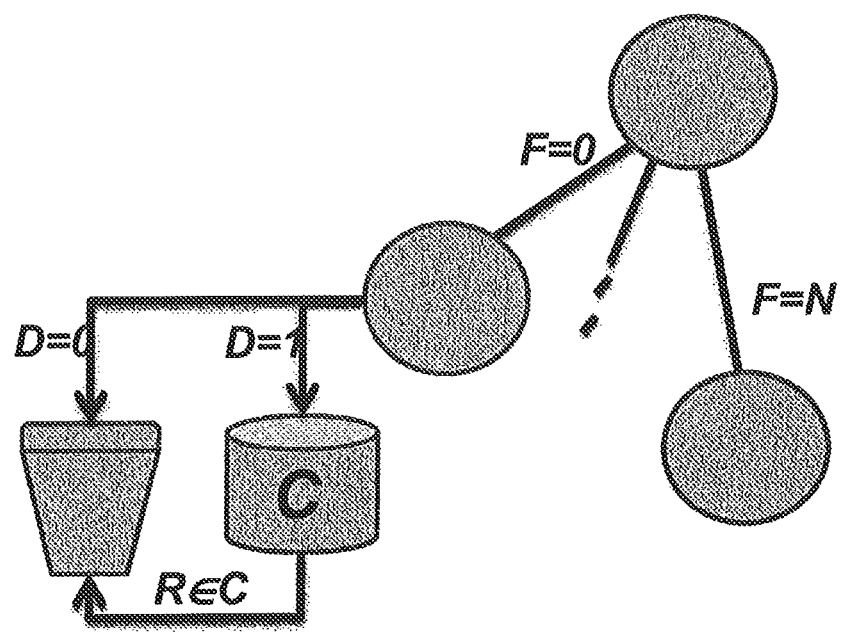
FIG. 1 illustrates the caching policies in a ICN node.
Figure 2A:
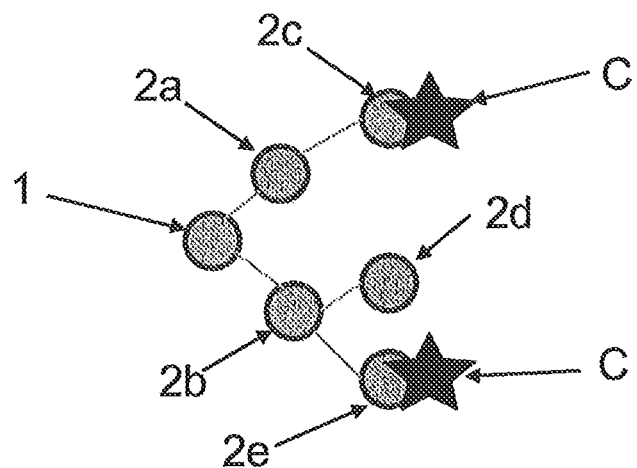
FIGS. 2a-2f are schemes of an example of a ICN network during consecutive steps of an embodiment of a method according to the invention.

An example of such a network is represented by FIG. 2a. Without loss of generality, a "tree" scheme will be used as example in the following description, though it is to be pointed out the present method to apply on any arbitrary topology. In this example, there are six nodes 1, 2a, 2b, 2c, 2d, 2e. Each node comprises processing means (for example a processor) and caching means (i.e. data storage means, for example a DRAM memory or a Solid-State Drive (SSD)).

The node 1 is considered as a "first" node, i.e. a node at which is received a request i for a data packet C. This request is an "interest packet", which may come for a client (for example an equipment like a personal computer willing to access a content (in particular a video) comprising said data packet) or another node. If the requested data packet C is stored by the first node 1, then this node just responds to the request i by forwarding the data packet C (to the requesting equipment).

Other nodes 2a, 2b, 2c, 2d, 2e are considered as "second" nodes, i.e. a node with which the first node is going to interact if it does not store the data packet C. In the represented example, only two nodes 2c and 2e stores the data packet (represented as a star).

Traditionally, as already explained, ICN nodes send interest packets that are stored as breadcrumbs at intermediate routers. Upon reception of content matching a specific interest, the content data is sent back to the ICN node, satisfying the interest. The problem with this approach is that, in case the network is explored to look for the closest cached replica, multiple of such interest are generated. In turn, whenever a ICN node having data that satisfy the interest is hit, data is send back to the requesting node. It follows that data will travel in the network, and will be possibly replicated at multiple nodes among those explored due to independent caching decisions. In turn, the cache storage space of nodes is polluted by this content, that replicates more than necessary and let request flooding have possibly very negative consequences. As the larger the radius of the explored network fraction, the larger the damage.

As it will be now explained, the present invention relies on the use of "meta-interest" packets between first and second nodes, to complement classic interest packets in ICN.

It is to be noted that in practice a node, and even any node 1, 2a, 2b, 2c, 2d, 2e can advantageously act as both a first and a second node.

Indeed, interest packets may be received from everywhere, and contents may also be stored everywhere.

A node should therefore:
behaves as a first node 1 if receiving a request i for a data packet C; and
behaves as a second node 2a, 2b, 2c, 2d, 2e if receiving a request i' for meta-data packets @.

The present invention is not limited to any architecture of first and/or second nodes.

Meta-Interest Packets

A said meta-interest packet refers to a request i' for meta-data packets @, a meta-data packet @ indicating availability of said data packet C at a target node.

In other words, upon reception of a meta-interest packet, nodes whose content stores held a copy of the data of interest do not generate data in return; rather, it does generate a meta-data, indicating availability of content at that particular location. It follows that nodes along the path can collect information about the availability of temporary copied, without this having a direct effect on their cache—as the content is not traveling back, no caching decisions, nor replacement, actually happen.

Meta-interest packets are meant to triggers meta-data transmission, as opposite to regular interest packets that trigger regular data transfers.

In a possible embodiment, the meta-data packet @ indicating availability of said data packet C is a header of the data packet C (the payload of the meta-data packet is empty), or at least a specific flag of the ICN packet. In another embodiment, a method on the ICN payload could be used to indicate meta-interest (e.g., the keyword "META").

Figure 2B:
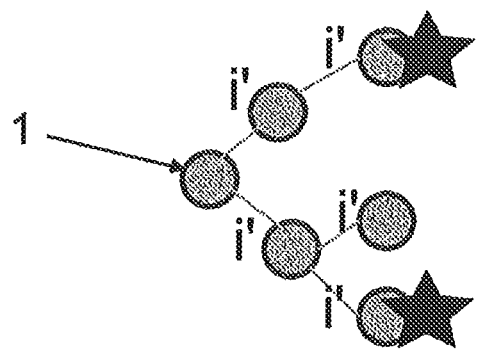

Thus, as it can be seen in FIG. 2b, if the data packet C is not stored by the first node 1, this node sends to at least one neighboring node 2a, 2b of the network the request i' for meta-data packets @.

Figure 2C:
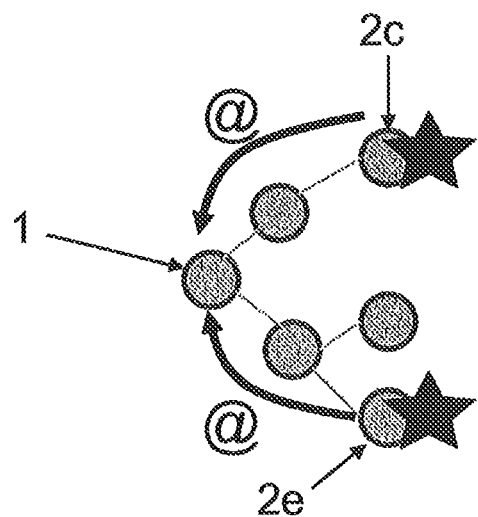

Then, when a second node 2a, 2b, 2c, 2d, 2e receives a request i' for meta-data packets @:
either the data packet C is not stored by the second node (case of second nodes 2a, 2b), and then they forward to at least one neighboring node of the network the request i' for meta-data packets @ (in FIG. 2b, the node 2a forward the request i' to the node 2c, and the node 2b forward the request i' to the nodes 2d and 2e), and so on;
or the data packet C is stored by the second node (case of second nodes 2c, 2e, reached at the second level of propagation of the meta-interest packet, see FIG. 2c), and these nodes 2c, 2e responds to the request i' by forwarding the meta-data packet @ indicating availability of said data packet C at the second node 2c, 2e.

The response to the meta-interest packet may be done either directly to the first node 1 having initiated the request i' (which is represented by FIG. 2c), or through the second nodes having forwarded the request i'. In such a case the "forwarding" second node 2a, 2b receives in response (to the forwarded request i') at least one meta-data packet @, and responds to the request i' by forwarding each received meta-data packet @ (to the node from which the request i' has been received). As it will be explained below, the location of a node at which said data packet is available may be defined by a sequence of hops.

The propagation of meta-interest packets (i.e. the choice of the at least one neighboring node 2a, 2b, 2c, 2d, 2e to which a request i' for meta-data packets @ is sent or forwarded) is preferably done according to a given forward policy.

The at least one neighboring node 2a, 2b, 2c, 2d, 2e to which a request i' for meta-data packets @ is sent or forwarded, is/are chosen according to a given forwarding policy.

Policies F used for interest packets can be used (see above), for example SPR ("Shortest Path Routing", already mentioned above), but alternative policies like flooding (where the meta-interest packet is forwarded to possibly all neighboring nodes), in particular scoped flooding (i.e. flooding within a given exploration radius ρ, in other words a meta-interest packet can only travel within ρ hops; examples of suitable ρ-values will be given later).

In case of such a policy, the exploration of the network can thus be carried out with TTL (Time To Live) scoping. In this method, a header field called TTL is set to a given value (ρ hops; examples of suitable ρ-values will be given later). Every time a router forwards the packet (i.e. at each hop), it decrements the TTL field in the packet header, and if the value reaches zero (TTL_0=max TTL=ρ), the packet is dropped. In another embodiment, dynamic forwarding of application EP013306124 could be used.

It is to be noted that flooding is usually to be avoided in case of propagation of normal interest packet, due to cache overheading and forced cache eviction, which does not occurs with meta-data. In the present method, flooding will provide the most complete answers in the shortest time, and can be used without any negative side-effect due to meta-data.

When the first node 1 receives a meta-data packet @, it becomes able to identify at least one target node (in our example nodes 2c, 2e) wherein said data packet C is available. In other words, the first node "knows" where the data packet is to be found, virtually achieving an ideal forwarding policy F. Tests detailed below will show that the present method is very close to ideal Nearest Replica Routing (iNRR) already mentioned above.

Figure 2D:
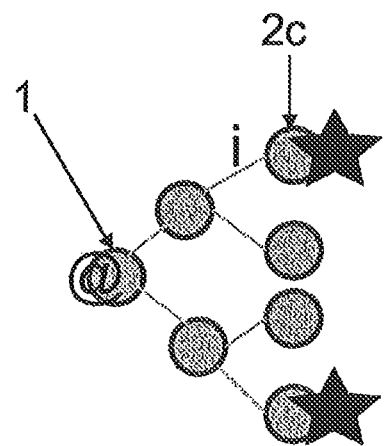

The first node having received at least one meta-data packet selects one target node (node 2c in the example of FIG. 2d) among identified target nodes 2c, 2e. The selected target node 2c could be the node among identified target nodes 2c, 2e from which is firstly received at the first node 1 the meta-data packet @ indicating availability of said data packet C. The "first" means the quickest in replying, so targets are chosen as having shortest delay (typically, the first reply will come from the closest replica). Alternatively, the selected node may be the closest in number of hops, the one with the least loaded path, or according to any other criteria in some metric space.

The first node 1 forwards the request i (i.e. the interest packet, and no more the meta-interest packet) for said data packet C toward selected target node 2c (which then acts as a first node in which the data is stored).

Figure 2E:
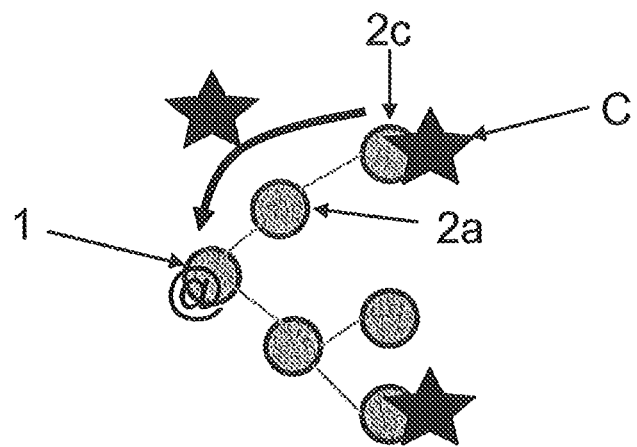

As represented by FIG. 2e, the first node therefore receives in response the data packet C, and consequently responds to the request i by forwarding the data packet C (to the equipment from which the request i originates). It is to be noted that actually the FIB is populated with information coming from the meta-data process, and what is identified in practical by the first node 2a is not a target node as such, but an interface (i.e. a link with a neighboring node) for the next hop toward this target node. When each node behaves accordingly, a target node is defined by a sequence of hops from the first node. Thus, the first node 2a selects an interface among interfaces toward one of identified target nodes, and forward the request i on the selected next hop interface, and so on up to the target node.

Caching Policies

As already explained, while a policy F has been correctly select, the subsequent selection of the D, R pair has a significant impact on the achievable ICN performances.

Thus, the step of receiving at the first node 1 the data packet C from the selected target node 2c comprises caching the data packet C at the first node 1 and/or any node 2a through which the first node 1 is connected to the selected target node 2c, according to a given caching decision policy D.

While Leave a Copy Everywhere (LCE) is generally used in known discovery methods, in the present method the preferred caching decision policy is Leave a Copy Down (LCD). This is very useful: the use of meta-data avoids unnecessary cache eviction that otherwise results from forwarding techniques such as flooding. The use of meta-caching policies, such as simple Uniform probabilistic decisions or LCD avoid further reduces cache pollution by either reducing evictions due to unpopular content (Uniform) or evictions due to storing the same content at multiple consecutive nodes in a path (LCD). Other meta-caching policies (such as ProbCache and BTW) that are based on the distance traveled in the network, or on the graph-related properties of network nodes have been proposed as well, with which the current invention is interoperable (though benefits are expected not to be larger than with LCD or Uniform meta-caching).

It is therefore to be understood that the present method is not limited to any caching decision policy.

Furthermore, the step of receiving at the first node 1 the data packet from the selected target node 2c comprises deleting the data packet C in at least one identified target node 2c, 2e according to a given cache replacement policy R. The preferred cache replacement policy is Least Recently Used (LRU). Random replacement is also suitable.

Alternatively, in a Move a Copy Down policy (MCD), when the content is stored at a new node, it is also removed at the node originally storing it. Deletion in Leave a Copy Down (LCD) instead happens in separate times: when the content is stored at a new node, it also remains in the original node, and will be removed in the original node only when the replacement policy will select it (which happens since the new node cache now filters requests for such content; as requests no longer reach the original node, so that LRU pointers at the original node will not be updated and the content will remain popular at the new node only).

Figure 2F:
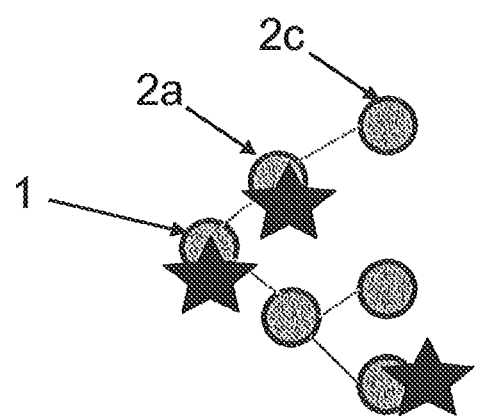

The FIG. 2f represents the state of the network example after having applied a cache replacement policies: a copy of the data packet C has been stored on the node 2a, and the copy on the node 2c has been deleted.

Practical NRR and Performances

Ideal Nearest Replica Routing (iNRR) is not a practical scheme, as it requires instantaneous knowledge of the full system state at any node (oracle). However, approximate iNRR behavior can be implemented with either NRR' (prior art): use of regular interest and data packets, in a single phase NRR" (which designates the present method while using scoped flooding): use of meta-interest and meta-data packets in a first phase; use of regular interest and data packets, in a second phase ( The triple <NRR",LCD,LRU> appears to reach performance that are arbitrarily close to the ideal ones achieved by iNRR.

With respect to classical implementation NRR' with regular interest and data packets, for a given network configuration the time to retrieve the data (called time to the first chunk if the content is video) with NRR" is slightly longer (because of the time for sending meta-interest packets then receiving meta-data packets: in NRR' whenever the data is found, it is immediately sent back, whereas NRR" requires an additional phase increasing the duration of about 25% in the scenarios under test, and only for the first chunk), but as pollution is avoided, the average distance shortens, hence the content is closer, and the time to the first chunk becomes also ultimately shorter with NRR".

In terms of cache eviction, NRR' and NRR" have been compared to iNRR (see FIG. 3) by measuring the number of additional hops needed on average to fond the content.

Figure 3:
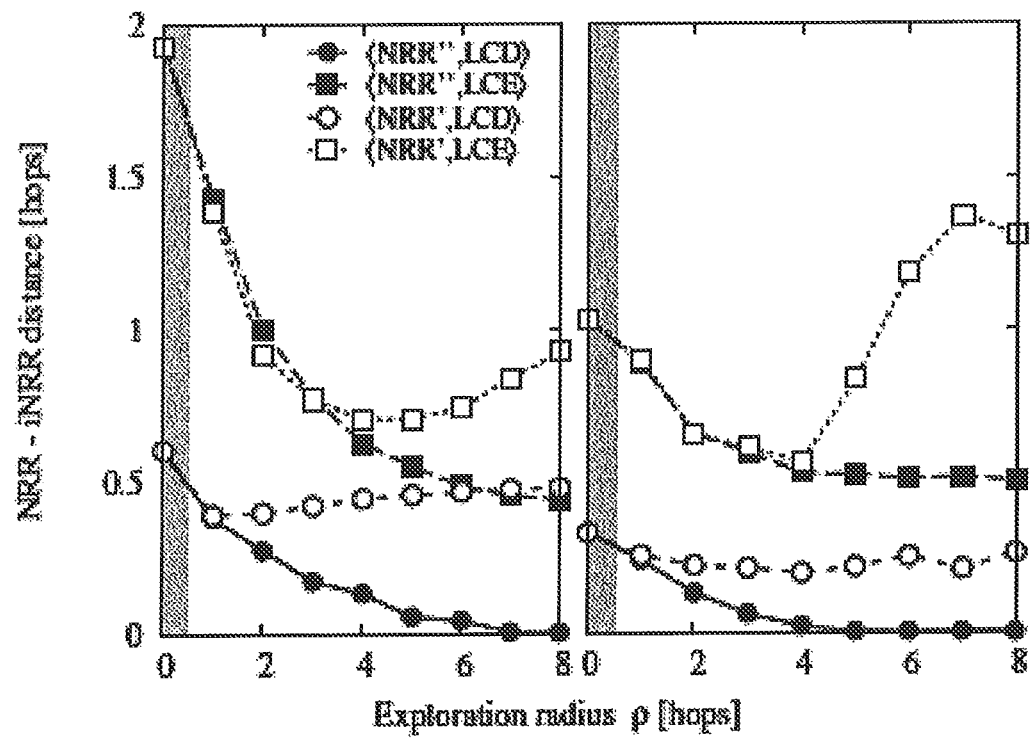
FIG. 3 represents graphs comparing the distance with respect to an iNRR scheme with or without performing the method according to the invention, for two cache decision policies, in two examples of ICN networks.

For completeness, the policies D∈{LCE, LCD} and F∈{NRR',NRR"} have been considered. Performance are expressed as the number of additional hops with respect to the ideal ICN strategy <iNRR, LCD, LRU>. FIG. 3 depicts the number of additional hops as a function of the radius ρ for a 10×10 grid (left) and for a 6-level fully redundant binary tree (right) network topologies.

Several interesting insights are gathered from FIG. 3. First, performance of <iNRR,LCD,LRU> can be approximately arbitrarily close with <NRR",LCD,LRU>, as the additional distance goes to zero for TTL-scoped flooding with ρ≥6 on trees and grids. Second, cache eviction due to LCE implies an important performance penalty for both NRR' and NRR", as already mentioned. Third, cache eviction translates into an important performance penalty as well. This is due to the use of regular request packets in NRR', generating data in return that possibly yields multiple cache evictions (even under LCD). Fourth, notice that additional distance decreases for growing ρ only in the case of NRR": this means that NRR" exploration is not only effective but also robust. Conversely, in the NRR' case, whenever ρ increases, eviction increases as well due to both higher chance to find the content on the one hand, and longer paths up to ρ on the other hand. This phenomenon is especially evident for the tree under LCE meta-caching: as soon as ρ becomes comparable with the distance to the repository, this allows a significantly larger portion of the tree to be explored, with consequent massive eviction.

It can therefore be concluded that <NRR",LCD> with (arbitrarily large) ρ values is able of (arbitrarily close) iNRR approximation.

As far as load in concerned, NRR" is clearly more lightweight than NRR'. Indeed, while the number of requests sent by NRR' and NRR" is the same, the amount of data chunks sent in return equals either (i) the number of cache hits for NRR', or (ii) the single closest hit for NRR". As chunks travel multiple links, NRR" significantly reduces the load not only because it sends a single chunk (major impact on load), but also because it sends the closest among all cached chunks (second order impact).

ICN Node & Network

In a second aspect, the present invention concerns a Information Centric Networking (ICN) node 1, 2a, 2b, 2c, 2d, 2e in a network, adapted for carrying out the method for managing packets as previously described.

The node comprises processing means configured so as to perform:
  if receiving a request i for a data packet C (the node acts as a first node),
    if the data packet C is stored by the node 1, 2a, 2b, 2c, 2d, 2e, responding to the request i by forwarding the data packet C;
    otherwise
    sending to at least one neighboring node 2a, 2b of the network a request i' for meta-data packets @, a meta-data packet @ indicating availability of said data packet C at a target node;
    receiving in response at least one meta-data packet @, so as to identify at least one target node 2c, 2e wherein said data packet C is available;
    selecting one target node 2c among identified target nodes 2c, 2e;
    forwarding the request i' for said data packet C toward selected target node 2c;
    receiving in response the data packet C;
    responding to the request i by forwarding the data packet C;
  if receiving a request i' for meta-data packets (the node acts as a second node),
    if the data packet is stored by the node 1, 2a, 2b, 2c, 2d, 2e, responding to the request i' by forwarding a meta-data packet @ indicating availability of said data packet C at the node 1, 2a, 2b, 2c, 2d, 2e;
    otherwise
    forwarding to at least one neighboring node 2c, 2d, 2e of the network the request i' for meta-data packets @;

The invention further proposes a network of Information Centric Networking (ICN) nodes 1, 2a, 2b, 2c, 2d, 2e according to the second aspect of the invention.

The invention claimed is:

1. A method for managing packets in a network of Information Centric Networking (ICN) nodes, the method comprising:
  at a first node, performing by a processor of the first node steps of:
    Receiving a request for a data packet,
    if the data packet is stored by the first node,
      responding to the request by forwarding the data packet;
    otherwise:
      sending to at least one neighboring node of the network a request for meta-data packets, at least one meta-data packet of said meta-data packets indicating availability of said data packet at at least one target node;
      receiving in response said at least one meta-data packet indicating availability of said data packet, so as to identify at least one target node wherein said data packet is available;
      selecting one target node among said identified at least one target node;
      forwarding the request for said data packet toward the selected target node;
      receiving in response the data packet;
      responding to the request for said data packet by forwarding the data packet;
  at a second node, performing by a processor of the second node steps of:
    Receiving the request for meta-data packets,
    if the data packet is stored by the second node,
      responding to the request for meta-data packets by sending a meta-data packet indicating availability of said data packet at the second node; otherwise
      forwarding to at least one neighboring node of the network the request for meta-data packets.

2. A method for managing packets according to claim 1, wherein said at least one meta-data packet indicating availability of said data packet is a header of the data packet.

3. A method for managing packets according to claim 1, wherein the at least one neighboring node to which a request for meta-data packets is sent or forwarded, is/are chosen according to a given forwarding policy.

4. A method for managing packets according to claim 3, wherein the given forwarding policy is scoped flooding within a given exploration radius.

5. A method for managing packets according to claim 1, wherein the step of receiving at the first node the data packet from the selected target node comprises caching the data packet at the first node and/or any node through which the first node is connected to the selected target node, according to a given caching decision policy.

6. A method for managing packets according to claim 5, wherein the given caching decision policy is Leave a Copy Down (LCD).

7. A method for managing packets according to claim 1, further comprising, upon receiving at the first node the data packet from the selected target node, deleting the data packet in at least one identified target node according to a given cache replacement policy.

8. A method for managing packets according to claim 7, wherein the given cache replacement policy is chosen between Least Recently Used (LRU) and random replacement.

9. A method for managing packets according to claim 1, wherein the selected target node is either a target node from which is firstly received at the first node a meta-data packet indicating availability of said data packet, or a target node which is the closest in number of hops or the least loaded.

10. A method for managing packets according to claim 1, further comprising:
at the second node, performing by the processor of the second node the steps of:
Receiving a second request for a second data packet,
if the second data packet is stored by the second node, responding to the second request by forwarding the second data packet;
otherwise:
sending to at least one neighboring node of the network a second request for meta-data packets indicating availability of said second data packet;
receiving in response said at least one meta-data packet indicating availability of said second data packet, so as to identify at least one second target node wherein said second data packet is available;
selecting one second target node among said identified at least one second target node;
forwarding the second request for said second data packet toward the selected second target node;
receiving in response the second data packet;
responding to the second request for said second data packet by forwarding the second data packet;
at a third node, performing by a processor of the third node steps of:
Receiving the second request for meta-data packets,
if the data packet is stored by the third node,
responding to the second request for meta-data packets by forwarding a meta-data packet indicating availability of said second data packet at the third node;
otherwise
forwarding to at least one neighboring node of the network the second request for meta-data packets.

11. An Information Centric Networking (ICN) node in a network, comprising at least one processor configured so as to perform:
if receiving a request for a data packet,
if the data packet is stored by the node,
responding to the request by forwarding the data packet;
otherwise
sending to at least one neighboring node of the network a request for meta-data packets, at least one meta-data packet of said meta-data packets indicating availability of said data packet at at least one target node;
receiving in response said at least one meta-data packet indicating availability of said data packet, so as to identify at least one target node wherein said data packet is available;
selecting one target node among said identified at least one target node;
forwarding the request for said data packet toward the selected target node;
receiving in response the data packet;
responding to the request for said data packet by forwarding the data packet;
if receiving the request for meta-data packets,
if the data packet is stored by the node,
responding to the request for meta-data packets by sending a meta-data packet indicating availability of said data packet at the node;
otherwise
forwarding to at least one neighboring node of the network the request for meta-data packets.

12. A network of Information Centric Networking (ICN) nodes comprising:
a first node according to claim 11; and
a second node comprising at least one processor configured so as to perform:
if receiving the request for a data packet,
if the data packet is stored by the second node,
responding to the request by forwarding the data packet;
otherwise
sending to at least one neighboring node of the second node in the network a second request for second meta-data packets, at least one meta-data packet of said second meta-data packets indicating availability of said data packet at at least one second target node;
receiving in response said at least one meta-data packet indicating availability of said data packet, so as to identify at least one second target node wherein said data packet is available;
selecting one second target node among said identified at least one second target node;
forwarding the request for said data packet toward the selected second target node;
receiving in response the data packet;
responding to the request for said data packet by forwarding the data packet;
if receiving the request for meta-data packets,
if the data packet is stored by the second node,
responding to the request for meta-data packets by sending a second meta-data packet indicating availability of said data packet at the second node;
otherwise
forwarding to at least one neighboring node of the second node in the network the request for meta-data packets.

13. A non-transitory computer-readable medium comprising computer program instructions that, when executed by a processor, cause the processor to execute the steps of the method according to claim 1 for managing packets in a network of Information Centric Networking (ICN) nodes.

* * * * *